United States Patent
Poole

[11] 3,898,938
[45] Aug. 12, 1975

[54] DUAL MODE ELECTRIC VEHICLE FOR ROAD OR RAIL TRACK OPERATION

[75] Inventor: Charles W. Poole, Redlands, Calif.

[73] Assignee: Westinghouse Electric Corporation, Pittsburgh, Pa.

[22] Filed: Nov. 20, 1973

[21] Appl. No.: 417,644

[52] U.S. Cl. ............................................. 105/215 C
[51] Int. Cl.[2] ........................................ B61F 13/00
[58] Field of Search ............................... 105/215 C

[56] References Cited
UNITED STATES PATENTS

| | | | |
|---|---|---|---|
| 2,478,647 | 8/1949 | Watts et al. | 105/215 C |
| 2,655,873 | 10/1953 | McDonald | 105/215 C |
| 3,134,343 | 5/1964 | Matsumura | 105/215 C |
| 3,645,211 | 2/1972 | Gretzschel | 105/215 C |

Primary Examiner—Lloyd L. King
Assistant Examiner—John J. Love
Attorney, Agent, or Firm—H. G. Massung

[57] ABSTRACT

An electric vehicle operable on roadbeds or rail tracks being especially useful for mining application is provided. The vehicle is provided with rail trolley wheels which are movable between a raised position, when operated on a roadbed, and a lowered position, used when operating on rails. The rail wheels are connected to the same axles which support the vehicle frame from the road wheel. A leaf spring suspension system is attached to the axle for supporting the vehicle weight on the axles so that even with the rail wheels lowered and in contact with the rails the weight of the body of the vehicle is supported through the same suspension system. This keeps the suspension spring system compressed even during rail operation and does not necessitate any substantial increase in the height or head room requirement of the vehicle when operating on rails. This is advantageous when operating in tunnels with minimum head room. The rail wheels are also located close to the road wheel to result in a small wheel base when operating on the rails, enabling the vehicle to negotiate exceptionally tight bends without derailment. To further improve the tracking ability of the vehicle when operating on rails the rear trolley wheels are pivotally mounted for sharp turning.

3 Claims, 6 Drawing Figures

DUAL MODE ELECTRIC VEHICLE FOR ROAD OR RAIL TRACK OPERATION

BACKGROUND OF THE INVENTION

This invention relates to powered vehicles and more particularly to powered vehicles for personnel or pay load transportation with road and railway track capability.

In the prior art, road or highway-type vehicles to which rail trolley wheels are attached are usually standard gasoline powered trucks or passenger cars. The trolley wheels and the supporting frame members are only attached to the vehicle chassis frame at the extreme ends of the vehicle some distance from the road wheels and are completely separately from the suspension system of the vehicle. This causes a substantial increase in height of the vehicle when operating on rails and results in large troley wheel base for the vehicle. This is a disadvantage when operating on tracks which have sharp turns or in a low head clearance environment.

SUMMARY OF THE INVENTION

An electric vehicle which is operable on roadbeds and on rail tracks is provided. The electric vehicle has a front axle to which are attached a pair of road wheels and a pair of rail trolley wheels. The trolley wheels are pivotally mounted for movement between a raised and a lowered position. The rail wheels are supported by a subassembly which is pivotally attached to the front axle. Leaf springs attached to the front axle are provided for supporting a portion of the vehicle weight on the front axle even with the rail wheels raised or lowered and in contacts with the rails. The front leaf springs, therefore, are held in a compressed state at all times. Normal height is defined as the overall height of the vehicle when used for roadbed operation. With the rail wheels lowered, the front road wheels are raised slightly above and off the rails and the normal height of the vehicle is increased by an amount only equal to the separation of the road wheels from the rail track.

A rear axle is provided to which is attached a pair of road wheels and a pair of pivotally mounted rail trolley wheels which are movable between a raised position separated from the rails and a lowered position in contact with the rails. With the rear rail wheels lowered, the rear road wheels which provide the means of propulsions of the vehicle remain in contact with the rails. The rail wheels are mounted to a subassembly which is pivotally attached to the rear axle. The rail wheels are hinge mounted to the subassembly to facilitate tracking when negotiating tight radius bends. Rear leaf springs support a portion of the vehicle weight on the rear axle when the rail wheels are in the raised or in the lowered position. The front and rear leaf springs support the vehicle frame when the rail wheels are in the raised or lowered position.

Rail trolley wheels are located close to the road wheels which result in a small wheel base of the trolley wheels. This further enhances the ability of the vehicle to negotiate exceptionally tight bends.

Operating means are provided for raising and lowering the front and rear trolley wheels. The operating means are responsive to an operator signal and are attached to pivot the rail wheels between the raised and lowered position when activated. The operating means can comprise a jack screw, a hydraulic ram or other similar devices.

It is an object of this invention to provide an electric vehicle particularly adaptable for use in mines which can be operated on rails or a roadbed without substantially changing the height of the vehicle.

Another object of this invention is to provide a vehicle for operation on road or rails in which the weight of the vehicle is supported through the same vehicle suspension system when operating on road or rails.

A still further object of this invention is to provide an electric vehicle particularly useful for operation in mining having a small wheel base and pivotally attached rail wheels which permit negotiating small radius turns without derailment.

BRIEF DESCRIPTION OF THE DRAWINGS

For a better understanding of the invention reference may be had to the preferred embodiment exemplary of the invention shown in the accompanying drawing in which.

DESCRIPTION OF THE PREFERRED EMBODIMENTS

Figure 1:
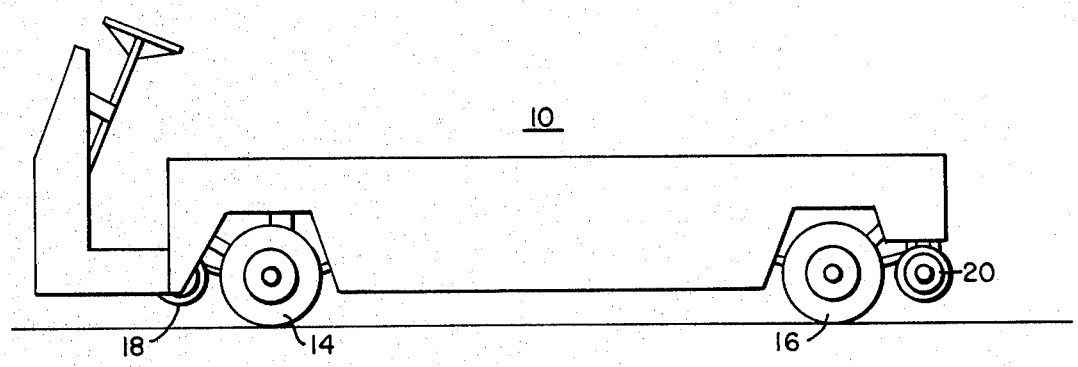
FIG. 1 is a side view of a vehicle utilizing the teaching of the present invention with the rail wheels in the raised position.
Figure 2:
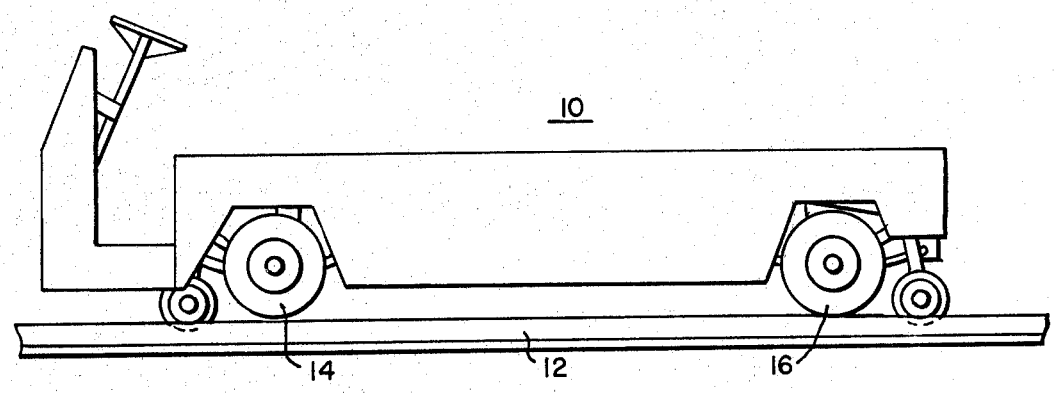
FIG. 2 is a view similar to FIG. 1 with the rail wheels in the lowered position.

Referring now to the drawings, there is shown an electric power vehicle 10 which is particularly adaptable for use in mines or other areas having a low clearance. The vehicle is to be used primarily, but not exclusively, in mining applications for the purpose of transporting personnel and/or pay loads, with the capability to operate on regular roadbed surfaces or to operate on railway tracks 12. Electric vehicle 10 is provided with front road wheels 14 and rear road wheels 16 for operation on a regular roadbed. In order to achieve rail operation, vehicle 10 in addition to the four normal road type tires and wheel assemblies 14 and 16, also, has two front flange trolley type wheels 18 and two flange trolley type rail wheels 20 for rail track usage.

Figure 3:
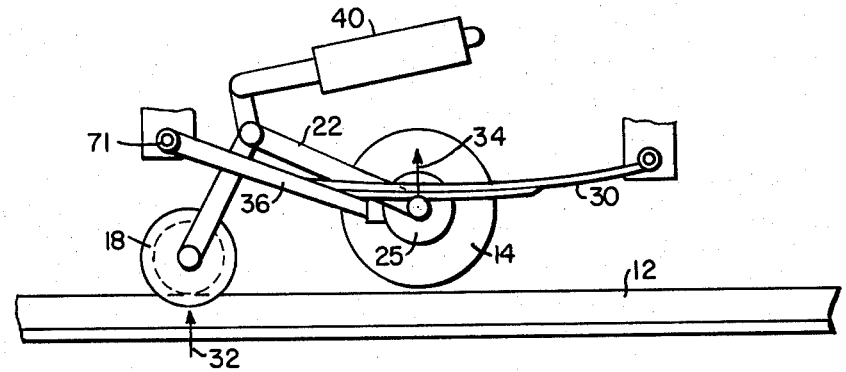
FIG. 3 is a side view of the front wheel assembly of the electric vehicle shown in FIG. 1 with parts omitted for clarity.
Figure 5:
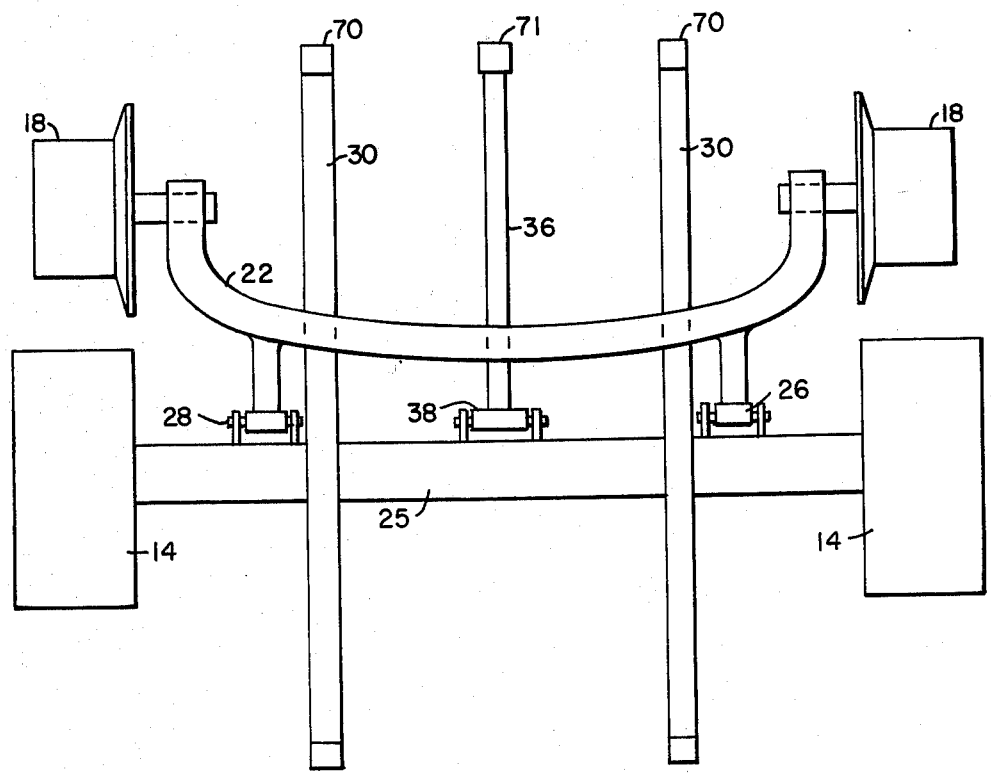
FIG. 5 shows a top view of a portion of a front wheel assembly.
Figure 6:
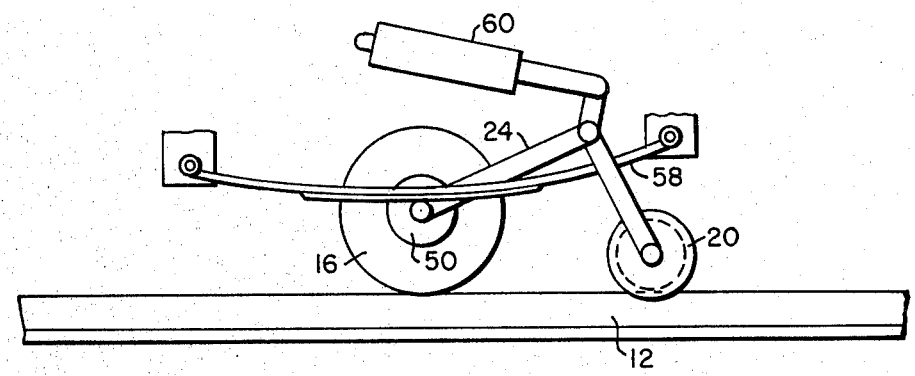
FIG. 6 shows a side view of the rear wheel assembly with parts omitted for clarity.
Figure 4:
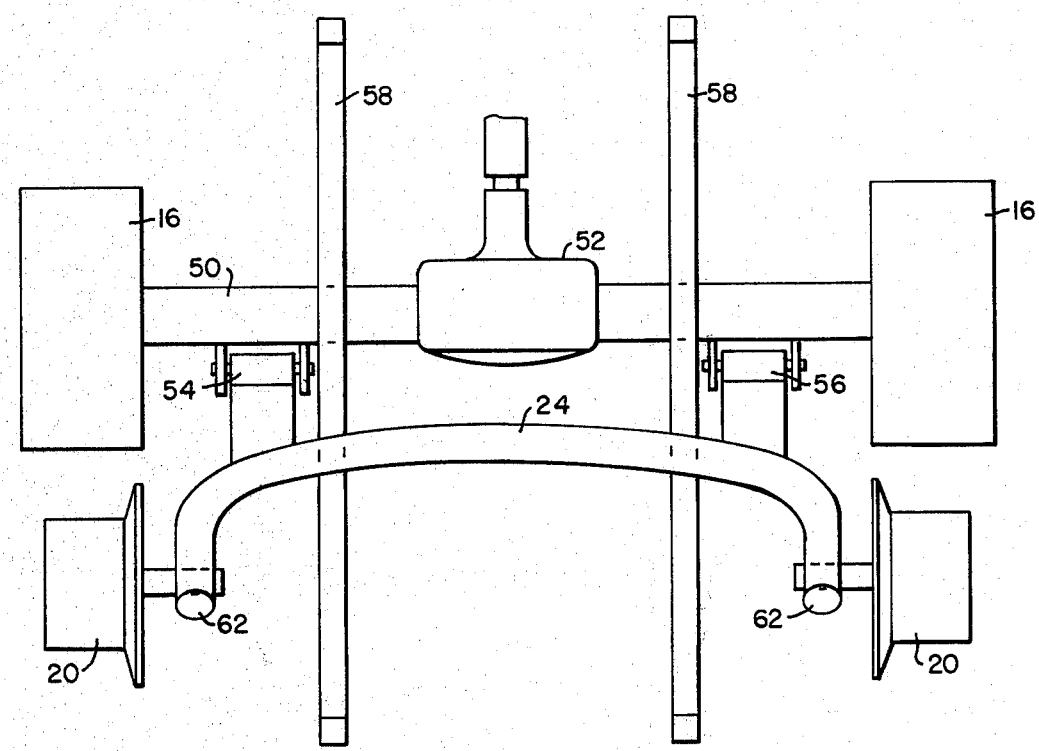
FIG. 4 shows a top view of a portion of the rear wheel assembly.

The front trolley wheels 18 used for rail operation are attached to sublifting frame assembly 22 which can be raised or lowered for road or rail operation of the vehicle 10. The rear trolley wheels are mounted to sublifting frame assembly 24 which can be raised or lowered for road or rail operation. Front axle 25 is provided for supporting wheels 14. Front subassembly 22 is pivotally attached to front axle 25 at points 26 and 28. Leaf springs 30 are attached to front axle 25 for supporting the weight of electric vehicle 10 on front axle 25. The weight of the electric vehicle 10 is supported through leaf springs 30 when operating on road or rail. As shown in FIG. 3, when operating on rails 12 with trolley wheels 18 lowered, the road wheels 14 are raised from rail 12. As shown by force arrows 32 and 34, the front end load reaction on wheels 18 is transmitted through axle 25 and leaf springs 30 to keep leaf springs 30 in compression when operating on road or rails. A radius arm 36 attached at one end to the frame of electric vehicle 10 and the other end to front axle 25 is provided to assure that the weight reaction force 32, with trolley wheels 18 lowered, is transmitted through trolley wheels 18 to leaf springs 30. Radius arm 36 is pivotally attached at point 38 to front axle 25, and attached to vehicle frame at point 71. A linear operating front jack 40 is provided for raising and lowering trolley wheels 18. As jack 40 extends or retracts, trolley wheels 18 are lowered or raised. One end of jack 40 is attached to the vehicle 10 frame while the other end is attached to subassembly 22 for raising or lowering trolley wheels 18.

A rear axle 50 is provided for supporting road wheel 16. Power is supplied to road wheels 14 and 16 form an electric motor (not shown) through a rear end differential 52. Rear sublifting frame assembly 24 is pivotally attached to rear axle 50 at points 54 and 56. Subassembly 24 moves pivotally around axle 56 when wheels 20 are raised or lowered. Rear leaf springs 58 are attached to axle 50 and help to support the weight of vehicle 10 on axle 50. Rear track wheels 20 are mainly guide wheels and do not support a substantial portion of the vehicle weight even when lowered and in contact with the rails 12. The rear road wheels 16 power vehicle 10 when operating on rails or on the road. A rear jack 60 is provided for raising or lowering rear track wheels 20 by pivoting subassembly 24 around rear axle 50. Jack 60 is attached at one end to the vehicle frame and at the other end to subassembly 24. Each rear trolley wheel 20 is pivotally attached to subassembly 20 at joints 62. This enables vehicle 10 to negotiate sharp bends. The weight of vehicle 10 is supported through leaf springs 30 and 58 when the rail wheels are in the raised or lowered positions.

The trolley wheels 18 and 20 are used for rail operation and are mounted to sublifting frame assemblies 22 and 24 respectively, which can be raised or lowered depending on the desired usage of the vehicle 10. If the vehicle 10 is being used on regular roadbeds then the trolley wheels 18 and 20 are raised and if the vehicle 10 is being used on rails 12 the trolley wheels 18 and 20 are lowered to engage the rail track 12. Propulsion for the electric vehicle 10 is provided at all times through the rear road wheels and tire assemblies 16, whether the vehicle is operating on road or track.

When electric vehicle 10 is operating on track, the front trolley wheels 18 are lowered to such an extent as to raise the front road tires 14 off the track 12, the rear trolley wheels when operating on rail are lowered only until they touch the track and do not unload the rear road wheel and tire assemblies 20 from the tracks 12. The trolley wheels 18 and 20 are raised and lowered by means of electrically powered screw jacks 40 and 60 attached to the subframe assemblies 22 and 24 at one end and to the vehicle frame at the other end. Other mechanical, electric, or hydraulic devices can be applied for raising and lowering assemblies 20 and 24.

In order to negotiate exceptionally sharp railroad curves which may be encountered in mining applications the trolley wheels 18 and 20 are located as close as possible to the road wheels and tire assemblies 14 and 16, but do not interfere with normal functioning of the road-type wheels and tire assemblies 14 and 16. In addition, the rear trolley wheel assemblies 20 are mounted to the trolley wheels sublifting frame assembly 24 by means of pivoting devices 62 to further increase tracking abilities when traveling on the rail track in radius curve situations. The sublifting frame assembly 22 for the trolley wheels 18 at the front of the vehicle is mounted to and pivotally about the front axle assemblies 25. The front axle 25 is connected to the vehicle 10 body by means of two leaf spring assemblies 30. Jack 40 which is used to lower or raise the sublifting assembly 22, whether electric, mechanical, hydraulic or manual is mounted and fastened at one end to the sublifting frame assemblies 22 and at the other end to the vehicle frame. The extension or retraction of this device lowers or raises the sublifting frame assembly 22 and moves the trolley wheels 18 by rotation about the pivot points 26 and 28 which are mounted to the front axle assembly 25. In addition, to insure the correct function of the front trolley wheels mechanism a radius arm member 36 is pivotally mounted to the front axle assembly 25 in line with the pivot axis points 28, 26 of the front sublifting frame assembly 22. At the other end of the radius arm 36 is fastened to the vehicle frame to be approximately in line with the front leaf spring eyes points 70 of the front suspension leaf springs 30.

The rear sublifting frame assembly 24 is mounted and pivoted about the rear drive axle assembly 50. Similar to the front end installation, the sublifting frame assembly 24 and trolley wheels 20 are raised and lowered by an extending or retracting device 60, which has one end fastened to the sublifting frame assembly 24 and the other attached to the vehicle frame. The lifting devices 40 and 60 are caused to extend or retract by manipulation of the control mechanism such as switches, valves or the like by the operator. The exact amount of load and travel of the extending and retracting devices can be controlled by travel limit switches mounted on the electric vehicle 10.

A novel aspect of this disclosure over the prior art is that the main carrying point of the trolley wheel assemblies 18 and 20 is directed into the suspension systems 30 and 58 of the vehicle 10 by means of sublifting frame pivots 26, 28, 54 and 56 which are attached to the front and rear axle assemblies 25 and 50. Advantage of this arrangement particularly at the front end where the trolley wheels are lowered for operation on the rail tracks is that the front suspension springs 30 remain compressed due to the reaction of the front end load on the trolley wheels 18 acting through the sublifting frame 22 and into the front axle 25 by means of the front axle attached pivot points 26 and 28. This results in relieving the load from the front road wheel 14 by lowering trolley wheels 18. When trolley wheels 18 are lowered the relationship of the suspension springs 30 and road wheels 14 to the vehicle, change very little. Therefore, in relieving the front road wheels 14 of load the front end of the vehicle 10 will not be raised up from the rail track 12 by any substantial amount. That is the height of the vehicle when the rail wheels 18 are lowered will only be increased by an amount equal the separation of road wheels 14 from track 12. This is of particular advantage when operating in a low ceiling tunnel where overhead clearance is minimum.

The disclosed vehicle 10 has several advantages over prior art vehicle such as: (1) rail trolley wheels 18 and 20 are located close to the road wheels which result in a small wheel base of the trolley wheels enabling the vehicle to negotiate exceptionally tight bends without derailment; (2) The rear trolley wheels are mounted on pivot 62 to the subframe 24 further enhancing the turnability of vehicle; (3) The front trolley wheels sublifting assembly 22 is mounted to the front axle 25 and the front suspension system 22 to maintain compression on the front leaf suspension spring 30 when front trolley wheels 18 are lowered and supporting the front end weight of vehicle 10. This results in minimum lifting up of the front end of the vehicle 10 which is advantageous for tunnel operation.

I claim:

1. An electric vehicle operable on roadbeds and on rail tracks comprising:
   a front pair of road wheels disposed toward the front of the electric vehicle;
   a rear pair of road wheels disposed toward the rear of the electric vehicle;
   a front axle supporting said front pair of road wheels;
   a rear axle supporting said rear pair of road wheels;
   a frame for supporting the body of the electric vehicle;
   front suspension means for resiliently supporting a portion of said frame from said front axle;
   a front set of rail wheels, disposed in close proximity to and longitudinally aligned with said front pair of road wheels, movable between a raised position and a lowered position and being connected to said front axle;
   front operation means for raising and lowering said front set of rail wheels;
   said front rail wheels being connected to said front axle so that when operating on rails with said front set of rail wheels lowered in contact with the rails said front set of road wheels are raised slightly above and out of engagement with the rails and a portion of the weight of the electric vehicle is supported by said front set of rail wheels through said front suspension means;
   a rear pair of rail wheels, disposed in close proximity to and longitudinally aligned with said rear pair of road wheels, movable between a raised position and a lowered position and being connected to said rear axle;
   rear suspension means for resiliently supporting a portion of said frame from said rear axle;
   rear operating means for raising and lowering said rear set of rail wheels;
   said rear set of rail wheels being connected to said rear axle so that when operating on rails with said rear set of rail wheels lowered and in contact with the rails said rear set of road wheels also contact said rails;
   drive motor means connected to said rear pair of road wheels for moving the electric vehicle on roadbeds and on railway tracks;
   a rigid front subassembly lifting frame pivotally mounted to said front axle and having said front pair of rail wheels attached thereto;
   a rigid rear sublifting frame pivotally attached to said rear axle and having said rear pair of rail wheels attached thereto;
   said front operating means for raising and lowering said first set of rail wheels comprises a single front linear operator connected to said front subassembly lifting frame to pivot said front subassembly lifting frame around the pivotal connection to said front axle thereby raising and lowering said front pair of rail wheels along an arcuate path;
   said second operating means comprises a single rear linear actuator connected to said rear subassembly lifting frame for pivoting said rear subassembly lifting frame about the pivotal connection to said rear axle to raise and lower said rear set of rail wheels along an arcuate path;
   said front suspension means comprises leaf springs with both ends connected to said frame and intermediate the ends connected to said front axle; and,
   said rear suspension means comprises leaf springs; and including a radial arm pivotally connected at one end to said front axle and connected at the respective opposite end to said frame in approximate alignment with one end of the leaf springs.

2. An electric vehicle as claimed in claim 1 wherein:
   said front linear actuator comprises a jack screw; and,
   said rear linear actuator comprises a jack screw.

3. A vehicle as claimed in claim 1 comprising;
   connecting means for supporting said rear wheels; and,
   each of said rear wheels being pivotally attached to said connecting means.

* * * * *